United States Patent
Machani et al.

(10) Patent No.: US 9,197,411 B2
(45) Date of Patent: Nov. 24, 2015

(54) PROTOCOL AND METHOD FOR CLIENT-SERVER MUTUAL AUTHENTICATION USING EVENT-BASED OTP

(75) Inventors: Salah E. Machani, Thornhill (CA); Konstantin Teslenko, Richmond Hill (CA)

(73) Assignee: IMS HEALTH INCORPORATED, Danbury, CT (US)

( * ) Notice: Subject to any disclaimer, the term of this patent is extended or adjusted under 35 U.S.C. 154(b) by 889 days.

(21) Appl. No.: 13/412,275

(22) Filed: Mar. 5, 2012

(65) Prior Publication Data

US 2012/0226906 A1   Sep. 6, 2012

(51) Int. Cl.
| | |
|---|---|
| *H04L 9/32* | (2006.01) |
| *H04L 9/08* | (2006.01) |
| *G06Q 20/38* | (2012.01) |
| *G06Q 20/40* | (2012.01) |
| *H04L 29/06* | (2006.01) |

(52) U.S. Cl.
CPC .......... *H04L 9/0863* (2013.01); *G06Q 20/3829* (2013.01); *G06Q 20/401* (2013.01); *H04L 9/3228* (2013.01); *H04L 9/3234* (2013.01); *H04L 9/3242* (2013.01); *H04L 63/0435* (2013.01); *H04L 63/061* (2013.01); *H04L 63/0838* (2013.01); *H04L 2209/56* (2013.01)

(58) Field of Classification Search
CPC ......... G06F 21/00; G06F 21/84; G06F 21/60; G06F 21/602; G06F 21/62; G06F 21/6209; H04L 29/06673; H04L 9/0861; H04L 9/0863; H04L 29/06789; H04L 63/0442; H04L 9/0816; H04L 9/0822
See application file for complete search history.

(56) References Cited

U.S. PATENT DOCUMENTS

| | | | | |
|---|---|---|---|---|
| 5,555,307 | A * | 9/1996 | Le Corre et al. | 380/243 |
| 6,928,558 | B1 * | 8/2005 | Allahwerdi et al. | 726/9 |
| 6,947,556 | B1 * | 9/2005 | Matyas et al. | 380/29 |
| 7,009,940 | B2 * | 3/2006 | Vialen et al. | 370/252 |
| 7,096,352 | B2 * | 8/2006 | Kang et al. | 713/152 |
| 7,213,144 | B2 * | 5/2007 | Faccin et | 713/153 |
| 7,472,269 | B2 * | 12/2008 | Perkins et al. | 713/155 |
| 7,624,421 | B2 * | 11/2009 | Ozzie et al. | 726/1 |
| 7,668,315 | B2 * | 2/2010 | Quick et al. | 380/264 |

(Continued)

OTHER PUBLICATIONS

Canadian Office Action for related Canadian Patent Application No. 2590989 dated Aug. 7, 2012, 6 Pages.

(Continued)

*Primary Examiner* — Krisna Lim
(74) *Attorney, Agent, or Firm* — Maldjian Law Group LLC

(57) ABSTRACT

A method of authenticating and encrypting a client-server communication is provided. Two one-time passwords (OTP1 and OTP2) are generated from a cryptographic token. An encryption key (K_ENC) and a MAC key (K_MAC) are generated based on OTP2. The client data are prepared and protected using K_ENC and K_MAC. A request message is sent from the client to the server, and contains the protected client data, a cryptographic token identifier and OTP1. OTP1 is validated at the server, and OTP2 is generated at the server upon successful validation. K_ENC and K_MAC are derived from OTP2 at the server. The request message is processed and result data is generated. The result data is encrypted using K_ENC and a digest is created using K_MAC. The encrypted result data is sent to the client, and is decrypted using K_ENC and the authenticity of the result data is verified using K_MAC.

10 Claims, 1 Drawing Sheet

(56) References Cited

U.S. PATENT DOCUMENTS

| | | | |
|---|---|---|---|
| 2001/0016907 A1* | 8/2001 | Kang et al. | 713/152 |
| 2002/0091931 A1* | 7/2002 | Quick et al. | 713/182 |
| 2002/0091933 A1* | 7/2002 | Quick et al. | 713/182 |
| 2002/0120844 A1* | 8/2002 | Faccin et al. | 713/168 |
| 2002/0178358 A1* | 11/2002 | Perkins et al. | 713/169 |
| 2003/0033518 A1* | 2/2003 | Faccin et al. | 713/153 |
| 2006/0059342 A1* | 3/2006 | Medvinsky et al. | 713/168 |
| 2006/0105749 A1* | 5/2006 | Han et al. | 455/412.1 |
| 2006/0112283 A1* | 5/2006 | Eldridge et al. | 713/193 |
| 2006/0159031 A1* | 7/2006 | Vialen et al. | 370/252 |
| 2007/0061566 A1* | 3/2007 | Bailey et al. | 713/151 |
| 2007/0220253 A1* | 9/2007 | Law | 713/168 |
| 2008/0034216 A1* | 2/2008 | Law | 713/183 |
| 2008/0168543 A1* | 7/2008 | von Krogh | 726/6 |
| 2009/0150968 A1* | 6/2009 | Ozzie et al. | 726/1 |
| 2009/0313687 A1* | 12/2009 | Popp et al. | 726/9 |
| 2010/0017604 A1* | 1/2010 | Husa | 713/168 |

OTHER PUBLICATIONS

White, Tom, "Hadoop: The Definitive Guide, 2nd Edition," Oct. 2010, O'Reilly Media, Inc., pp. i-601 (625 total pages).

\* cited by examiner

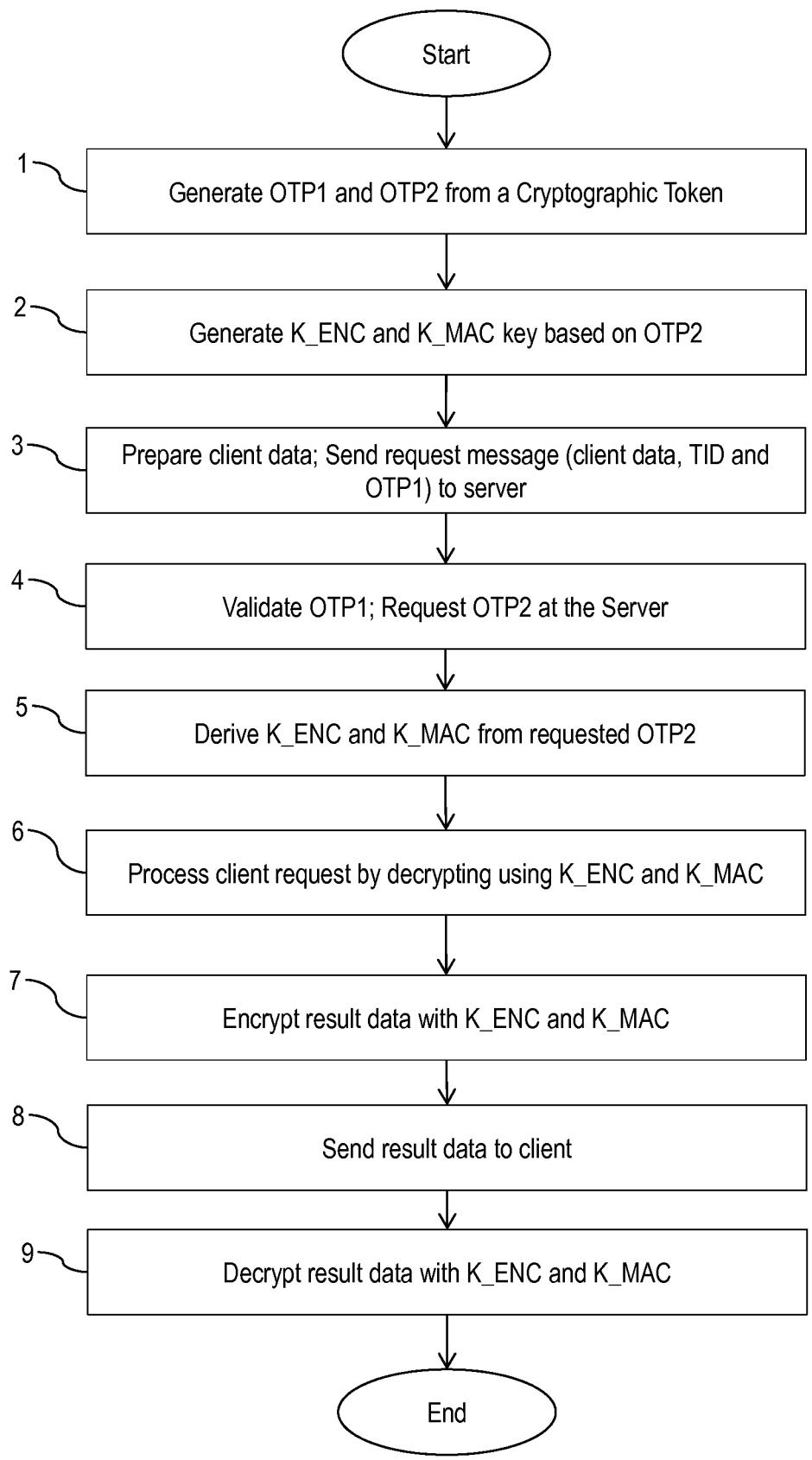

PROTOCOL AND METHOD FOR CLIENT-SERVER MUTUAL AUTHENTICATION USING EVENT-BASED OTP

FIELD OF THE INVENTION

The present invention relates to the field of data encryption and authentication. In particular, it relates to client-server mutual authentication and data encryption using a one-time password (OTP).

BACKGROUND OF THE INVENTION

With the increase in client-server communications, as well as the increase in the value of the data being communicated, there is a corresponding increase in the want and need for secure protocols for those communications. While there are existing data protocols, such as PKI (public-key infrastructure), they are not suitable for all communications and data. Additionally, they often require additional user authentication for use.

One-time passwords (OTPs) are gaining in popularity as a secure method of user authentication, particularly for financial transactions. However, OTPs are not generally found suitable for use in data encryption.

There is a need for a secure protocol that permits both authentication and encryption. Preferably, the secure protocol is based on the OTP framework.

There is also a need for a secure client-server protocol that does not require the existence of a public-key infrastructure.

It is an object of this invention to partially or completely fulfill one or more of the above-mentioned needs.

SUMMARY OF THE INVENTION

The invention comprises a method of authenticating and encrypting a client-server communication, comprising the steps of: a) generating a first one-time password (OTP1) and a second one-time password (OTP2) from a cryptographic token; b) generating an encryption key (K_ENC) and a MAC key (K_MAC) using OTP2 and other seeds; c) preparing and protecting client data using K_ENC and K_MAC; d) sending the request message from the client to the server, the request message containing a cryptographic identifier token (TID), OTP1 and the protected client data; e) validating OTP1 at the server, and generating OTP2 at the server upon successful validation; f) deriving K_ENC and K_MAC using OTP2 at the server; g) processing the request message and generating result data h) encrypting the result data using K_ENC and creating a digest using K_MAC; i) sending the encrypted result data to the client; and j) decrypting the result data at the client using K_ENC and verifying the authenticity of the result data using K_MAC.

The method may further include additional steps of encrypting client request data using K_ENC and MAC data with K_MAC at the client side, and decrypting with K_ENC and authenticating with K_MAC at the server side. Optionally, OTP1 can be validated by an external validation service.

K_ENC and K_MAC may be derived using standard passphrase-based key derivation algorithms.

The invention further includes a data encryption and authentication protocol incorporating the above method.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein:

FIG. 1 is a flow chart outlining a preferred method of the present invention.

DETAILED DESCRIPTION OF THE PREFERRED EMBODIMENTS

The inventive system and method presented herein comprises a client-server protocol for secure data interchange using one-time password (OTP) cryptographic tokens to provide mutual authentication between the client and server, as well as ensuring the authenticity, security and integrity of the data. The system extends the OTP framework beyond user authentication to encompass more robust security and encryption methods by using the OTP token to additionally generate encryption keys and MAC (Message Authentication Code) keys. The resulting method provides for authentication and data encryption with or without the existence of a public-key infrastructure.

The process of the method is shown in the flowchart of FIG. 1. First (Step 1), the client-side application generates the current OTP, OTP1, based on the OTP protocol and system in place i.e. cryptographic token, and generates the next OTP, OTP2 in the same manner. OTP1 and OTP2 are generated by any event and/or counter based OTP generation algorithm. An example is where OTP1 and OTP2 are generated using a HMAC (Hashed Message Authentication Code)-based OTP algorithm, such as that described in RFC 4226 ("HOTP: An HMAC-Based One-Time Password Algorithm").

At the next step (Step 2), the client application derives an encryption key, K_ENC, and a MAC computation key, K_MAC, from OTP2 and other seeds. K_ENC and K_MAC are derived using a key derivation function, such as PKDF2 (Password-Based Key Derivation Function). A SHA1-MAC (Secure Hash Algorithm) algorithm is preferred for MAC computation, although any "keyed" hash function can be used.

With all the keys created, the client prepares and protects the client data using K_ENC and K_MAC, then sends a request message to the server (Step 3). The message contains a cryptographic token identifier (TID) and OTP1. Optionally, encrypted request data using K_ENC and/or MAC data using K_MAC can also be sent as part of the message.

The server receives the message and validates OTP1 (Step 4) for the TID. OTP1 can be validated either internally, or by an external OTP validation service. If an external service is used, the link must be secure. After OTP1 is validated, the server requests OTP2.

Next (Steps 5 and 6), the server uses OTP2 to derive K_ENC and K_MAC (if necessary). Once derived, the server uses K_ENC to decrypt the client data in the message (if present) and K_MAC to verify the integrity and authenticity of the data (if present).

Once the client data is verified and decrypted using K_ENC and K_MAC, the server processes the request from the client, and encrypts the resulting data (Step 7) using K_ENC and generates a digest using K_MAC. The encrypted result data is then sent to the client (step 8).

Lastly (Step 9), the client decrypts and verifies the authenticity of the result data using K_ENC and K_MAC as described above.

This method represents a two-pass protocol, as the client sends OTP1 in the first pass as an identifier, and the result data is returned from the server using OTP2. The request data is cryptographically protected using the K_ENC and K_MAC keys derived from OTP2.

Sample Code

DEFINITIONS

‖—String concatenation
[x]—Optional element of value x
R_C—Pseudorandom value (chosen by client)
dsLen—Desired key length
KDF—Key derivation function OTP1 and OTP2 are generated by the client application using a HMAC-based One-Time Password algorithm (HOTP) from a cryptographic token (K_TOKEN) and a counter value (current_counter).

```
OTP1 = HOTP (K_TOKEN, current_counter)
OTP2 = HOTP (K_TOKEN, current_counter+1)
```

K_ENC is derived from OTP2 using a key derivation function such as PKDF2 and a passphrase string (a service specific static data string e.g. "Data Encryption"). Using PKDF2 as the key derivation function, R_C is the salt.

$K\_ENC = KDF(OTP2 \| \text{"Data Encryption"}[,R\_C][, count][,dsLen])$

K_MAC is derived from OTP2 and a passphrase string (a service specific static data string e.g. "MAC Computation") in a similar fashion to K_ENC. Preferably, a SHA1-MAC algorithm is used to generate MAC computation.

$K\_MAC = KDF(OTP2 \| \text{"MAC computation"}[,R\_C][, count][,dsLen])$

This concludes the description of a presently preferred embodiment of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A method of authenticating and encrypting a client-server communication, comprising steps of:
   a) generating a first one-time password (OTP1) and a second one-time password (OTP2) from a cryptographic token;
   b) generating an encryption key (K_ENC) and a MAC (Message Authentication Code) key (K_MAC) based on OTP2;
   c) preparing and protecting client data using K_ENC and K_MAC;
   d) sending a request message from the client to the server, the request message containing the protected client data, a cryptographic token identifier (TID) and OTP1;
   e) validating OTP1 at the server, and generating OTP2 at the server upon successful validation;
   f) deriving K_ENC and K_MAC from OTP2 at the server;
   g) processing the request message and generating result data;
   h) encrypting the result data using K_ENC and creating a digest using K_MAC;
   i) sending the encrypted result data to the client; and
   j) decrypting the result data at the client using K_ENC and verifying the authenticity of the result data using K_MAC.

2. The method of claim 1, wherein said request message further includes client request data encrypted with K_ENC and the method includes an additional step of decrypting the client request data at the server using K_ENC.

3. The method of claim 2, wherein said request message further includes MAC data encrypted with K_MAC and the method includes an additional step of authenticating the client request data using K_MAC.

4. The method of claim 1, wherein the step of validating OTP1 takes place internally at the server.

5. The method of claim 1, wherein the step of validating OTP1 takes place at a validation service external to the server.

6. The method of claim 1, wherein K_ENC and K_MAC are derived using PKDF2 (Password-Based Key Derivation Function).

7. The method of claim 1, wherein K_MAC is derived using a SHA-1 (Secure Hash Algorithm) MAC algorithm.

8. The method of claim 1, wherein OTP1 and OTP2 are derived using a HMAC-based (Hashed Message Authentication Code) OTP (One-Time Password) algorithm.

9. A system to authenticate and to encrypt a client-server communication, comprising:
   a processor; and
   a memory coupled to the processor, the memory comprising a data authentication and encryption protocol executable by the processor, wherein the data authentication and encryption protocol comprises:
   a) generating a pair of one-time passwords, OTP1 and OTP2, where OTP1 is used for user validation and OTP2 is used for key generation;
   b) deriving an encryption key, K_ENC derived from OTP2, used to encrypt data; and
   c) deriving a MAC key, K_MAC, derived from OTP2, used to authenticate encrypted data,
   wherein OTP1, OTP2, K_ENC and K_MAC are derived such that the protocol does not require a public-key infrastructure.

10. The system of claim 9, wherein K_ENC and K_MAC are derived using PKDF2 (Password-Based Key Derivation Function).

* * * * *